United States Patent Office 3,198,805
Patented Aug. 3, 1965

3,198,805
A-NOR-B-HOMO-STEROIDS HAVING ISOXAZOLE SUBSTITUENT AND PROCESS OF PREPARATION
Georges Muller, Nogent-sur-Marne, and Andre Poittevin, Les Lilas, France, assignors to Roussel-UCLAF, S.A., Paris, France, a corporation of France
No Drawing. Filed Oct. 19, 1962, Ser. No. 231,823
Claims priority, application France Oct. 30, 1961, 877,425
6 Claims. (Cl. 260—307)

The present invention relates to steroidal derivatives having modified rings and having heterocyclic substituents, as well as to the process of preparation and the method of use of these compounds.

The invention more particularly relates to A-nor-B-homo steriodal derivatives, the 3, 5 and 6 carbon atoms of which form part of an isoxazole ring as a heterocyclic substituent.

These new compounds can be represented by Formula I, which is considered theoretically as the most plausible structural formula with respect to the respective positions of the nitrogen and of the oxygen in the heterocycle.

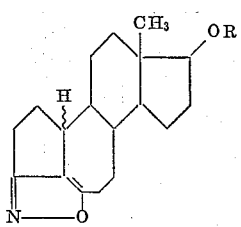

(I)

In this formula R designates hydrogen or an acyl radical of a hydrocarbon carboxylic acid having from 1 to 8 carbon atoms. The compounds thus envisioned can be called 17β-OR-isoxazolo-[3,5,6-c,d]-A-nor-B-homo - $\Delta^5$-10ξ-estrenes.

It is an object of the invention to produce an isoxazolo derivative of an A-nor-B-homo steroid having the formula

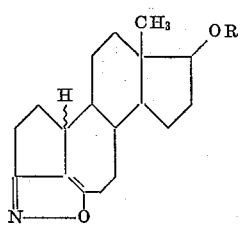

wherein R is selected from the group consisting of hydrogen and the acyl radical of a hydrocarbon carboxylic acid having from 1 to 8 carbon atoms.

It is another object of the invention to provide a novel process for the preparation of the isoxazolo derivative of an A-nor-B-homo steroid of Formula I.

Another object of the invention is the obtention of the intermediates, the 3-oximino derivatives of A-nor-B-homo steroids selected from the group consisting of

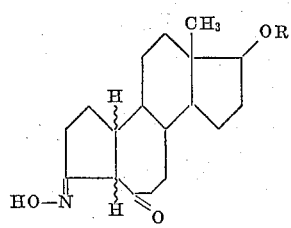

and

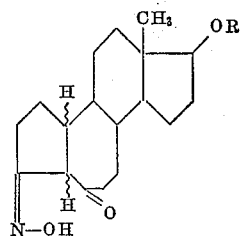

wherein R is selected from the group consisting of hydrogen and the acyl radical of a hydrocarbon carboxylic acid having from 1 to 8 carbon atoms.

A further object of the present invention is the treatment of testosteronic deficiencies which comprises administering from about 5 mgm. to about 40 mgm. per day of an isoxazolo derivative of an A-nor-B-homo steroid having the formula

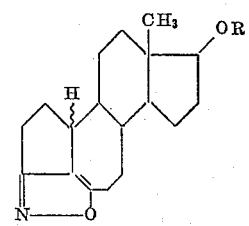

wherein R is selected from the group consisting of hydrogen and the acyl radical of a hydrocarbon carboxylic acid having from 1 to 8 carbon atoms.

These and other objects of the invention will become more apparent as the description thereof proceeds.

The compounds of the invention are isoxazolo derivatives of A-nor-B-homo steroids of Formula I

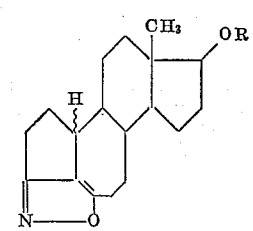

wherein R is selected from the group consisting of hydrogen and the acyl radical of a hydrocarbon carboxylic acid having from 1 to 8 carbon atoms, preferably a lower alkanoic acid.

The acyl radical of Formula I may be derived from hydrocarbon carboxylic acid having from 1 to 8 carbon atoms. Examples of suitable acids are acetic acid, butyric acid, isobutyric acid, valeric acid, isovaleric acid, trimethylacetic acid, methylethylacetic acid, caproic acid, heptanoic acid and benzoic acid.

The products according to the invention possess useful properties. They are endowed with a testosteronic activity and particularly an anabolic activity.

The process of preparation of these compounds is shown by the reaction flow diagram of Table I.

TABLE I

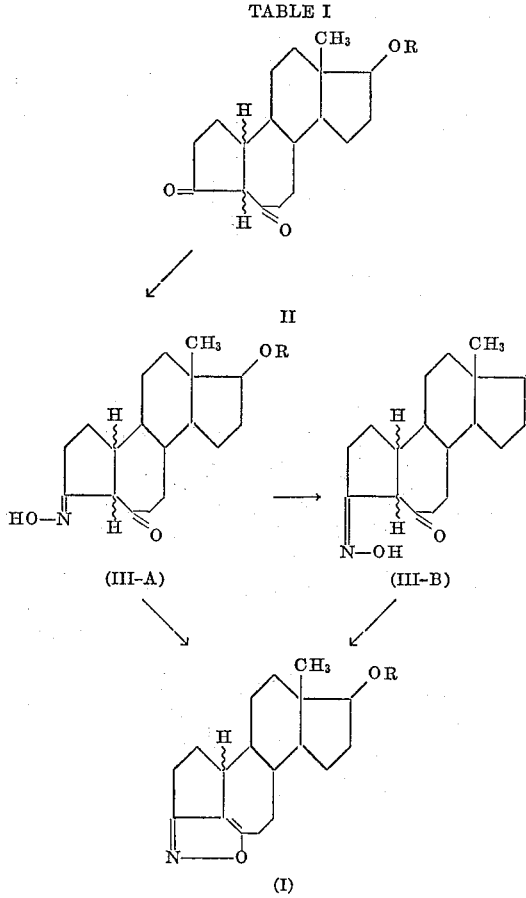

R represents hydrogen or the acyl radical of a hydrocarbon carboxylic acid having from 1 to 8 carbon atoms.

The said process is characterized essentially in that hydroxylamine is made to react on a 17β-OR-A-nor-B-homo-5ξ,10ξ-estrane-3,6-dione, II. The resulting 17β-OR-3-oximino-A-nor-B-homo-5ξ,10ξ-estrane-6-one, III, is cyclized with the aid of a dehydrating agent and a 17β-OR-isoxazolo-[3,5,6-c,d]-A-nor-B-homo-Δ$^{5}$-10ξ-estrene, I, is obtained.

The preparation of the 17β-OR-A-nor-B-homo-5ξ,10ξ-estrane-3,6-diones can be realized starting from a 17β-OR-3-oxo-Δ$^{5}$-10-estrene as is described in United States Patent No. 3,040,093 and commonly assigned United States patent application Serial No. 149,221, filed November 1, 1961, now Patent No. 3,061,636. A specific example of this process is given later.

The condensation of hydroxylamine with a 17β-OR-A-nor-B-homo-5ξ,10ξ-estrane-3,6-dione, II, is effected by heating the latter with about one molecular equivalent or a slight excess of hydroxylamine, or one of its salts, in an inert organic solvent at a temperature between about 50° C. and 150° C. A small amount of an alkali metal salt of a lower alkanoic acid, such as sodium acetate, is preferably present in the reaction mixture. The inert organic solvent is preferentially a lower alkanol, such as methanol or ethanol, a lower alkanoic acid, for example, acetic acid or propionic acid or a mixture of the two.

The condensation with hydroxylamine leads to one of the possible syn or anti isomers of 17β-OR-3-oximino-A-nor-B-homo-5ξ,10ξ-estrane-6-one (compounds of Formulas III-A and III-B). It is impossible to actually determine which of the respective structures of these two compounds is obtained.

The 17β-OR-3-oximino-A-nor-B-homo-5ξ,10ξ-estrane-6-one obtained by condensation with hydroxylamine can be cyclized directly into the isoxazolo derivative of Formula I, but it is advantageous to isomerize it at the nitrogen before this cyclization. The isomerization is effected by contacting with organic acids in the cold. Preferably these acids are lower alkanoic acids such as formic acid, pivalic acid, etc.

In addition, formic acid, at a more elevated temperature, can play the role of a cyclization agent in such a manner that, after isomerization with cold formic acid, it suffices to heat the isomerization mixture in order to obtain the isoxazolo compound of Formula I.

However, the best yields are obtained by separately cyclizing after the isomerization step by means of phosphorus oxychloride. The reaction is preferentially conducted in pyridine and at temperatures between −10 and +10° C.

The starting material utilized in Example 1, 17β-acetoxy-A-nor-B-homo-5ξ,10ξ-estrane-3,6-dione, is prepared as described hereafter and as described in Patent No. 3,040,093 and Serial No. 149,221, now Patent No. 3,061,636.

PREPARATION OF 17β-ACETOXY-A-NOR-B-HOMO-5ξ,10ξ-ESTRANE-3,6-DIONE (II WITH R=COCH$_3$)

*Step A—Ozonization.*—4.2 g. of 17β - acetoxy - Δ$^{5(10)}$-estrene-3-one were dissolved in a mixture of 17 cc. of methylene chloride and 20 cc. of methanol. The reaction mixture was cooled to −70° C. and ozone was made to bubble into the solution for a period of one hour and 20 minutes. The excess of ozone was removed by a current of nitrogen. Then, drop by drop, 2.1 cc. of trimethyl phosphite was added. The temperature of the reaction mixture was next allowed to mount to 0° C. Hydrogen peroxide was added in order to destroy the excess of trimethyl phosphite. Then 100 cc. of methylene chloride was added. The reaction mixture was washed with water, dried and evaporated to dryness under vacuum. The residue was crystallized from isopropyl ether and furnished 3.670 g. of 17β - acetoxy-5,10-seco-estrane-3,5,10-trione, having a melting point of 142° C. and a specific rotation $[\alpha]_D^{20}=-35°$ (c.=0.5% in chloroform). The product occurred in the form of colorless prisms, and was very soluble in chloroform, soluble in acetone and alcohol, less soluble in ether and insoluble in water.

*Analysis.*—Calculated: C, 68.9%; H, 8.1%; O, 22.9%. Found: C, 69.0%; H, 8.1%; O, 22.8%.

The I.R. spectra showed the presence of 3 carbonyl groups by bands at 1739, 1723 and 1711 cm.$^{-1}$.

This compound was described in Patent No. 3,040,093.

*Step B—Cyclization.*—3 g. of 17β - acetoxy-5,10-seco-estrane-3,5,10-trione were introduced under an atmosphere of nitrogen in 12 cc. of 90% acetic and the mixture was heated to reflux for a period of 15 minutes.

The reaction mixture was next poured into a mixture of water and ice and extracted with methylene chloride. The extracts were washed with water, dried, treated with animal charcoal, filtered and evaporated to dryness under vacuum. The residue was crystallized from ether and furnished 1.3 g. (being 46%) of 17β-acetoxy-A-nor-B-homo-Δ$^{5(10)}$-estrene-3,6-dione, having a melting point of 162° C. then 174° C., and a specific rotation $[\alpha]_D^{20}=+19°$ (c.=0.5%) in chloroform). The product occurred in the form of hexagonal prisms and was very soluble in alcohol, acetone and chloroform, very slightly soluble in ether and insoluble in water.

*Analysis.*—Calculated for $C_{20}H_{26}O_4$ (molecular weight =330.41): C, 72.7%; H, 7.9%. Found C, 72.6%; H, 7.9%.

U.V. spectra in ethanol: $\lambda_{max.}$ at 236 mμ, ε=12,600.

This compound was described in Patent No. 3,040,093.

*Step C—Reduction.*—2 g. of 17β - acetoxy-A-nor-B-homo-Δ$^{5(10)}$-estrene-3,6-dione, then 20 cc. of methanol and 2 cc. of acetic acid were introduced into a small conical flask. 1 g. of potassium borohydride was added to this suspension while agitating and maintaining the temperature in the neighborhood of +10° C. over a period of 15 minutes. Next, the reaction mixture was agitated for a period of 15 minutes at the same temperature, then diluted with 100 cc. of water. The aqueous solution was extracted with methylene chloride and the methylene chloride phase was decanted. This methylene chloride phase was washed with water, dried over magnesium sulfate and distilled to dryness. The dry residue was redissolved in 20 cc. of isopropyl ether. On standing, 17β-acetoxy-A-nor-B-homo-5ξ,10ξ-estrane-3,6-dione crystallized. 1.372 g., being a yield of 68% of theory, of a product melting at 166° C. were obtained. A second crystallization from isopropyl ether elevated the melting point to 168° C.

17β-acetoxy-A-nor-B-homo-5ξ,10ξ-estrane-3,6-dione occurred in the form of prismatic needles and was very soluble in acetone, benzene, chloroform, and soluble in alcohol and ether.

It had the following physical constants: melting point =168° C. Specific rotation $[\alpha]_D^{20} = +50°$ (c.=0.5% in chloroform).

I.R. spectra:
  Absence of alcoholic hydroxyl groups
  Presence of an acetate band at 1740 cm.$^{-1}$
  Presence of 2 ketone bands at 1649 cm.$^{-1}$ and 1610 cm.$^{-1}$ U.V. spectra:
  $\lambda_{max}$. in ethanol, 290 m$\mu$, $E_{1cm.}^{1\%} = 263$ $\lambda_{max}$. in ethanol containing N/10 sodium hydroxide 310 m$\mu$ $E_{1cm.}^{1\%} = 461$ The bathochrome effect was due to enolization of one of the ketone functions.

*Analysis.*—Calculated for $C_{20}H_{28}O_4$ (molecular weight=332.42): C, 72.26%; H, 8.49%; O, 19.25. Found: C, 72.5%; H, 8.3%; O, 19.1%.

This compound was described in Serial No. 149,221.

The following examples are illustrative of the invention. It is to be understood, however, that they do not limit the invention in any respect:

EXAMPLE I

PREPARATION OF 17β-ACETOXY-ISOXAZOLO-[3,5,6-c,d]-A-NOR-B-HOMO-Δ⁵-10ξ-ESTRENE (I, R=COCH₃)

*Step A.—Formation of the oxime.*—4 g. of 17β-acetoxy-A-nor-B-homo-5ξ,10ξ-estrane-3,6-dione, having a melting point of 168° C. and a specific rotation $[\alpha]_D^{20} = +50°$ (chloroform) were introduced into 45 cc. of 90% methanol containing 1.8 g. of sodium acetate. 0.92 g. of hydroxylamine hydrochloride were added and the reaction mixture was heated to the boiling point for a period of 30 minutes. The reaction mixture was poured into water, the product formed was vacuum filtered, washed with water, dried, and 3.5 g. of 17β-acetoxy-3-oximino-A-nor-B-homo-5ξ,10ξ-estrane-6-one were obtained, having a melting point of 230° C. and a specific rotation $$[\alpha]_D^{20} = +156°$$

(c.=0.5% in chloroform).

The product occurred in the form of prismatic crystals and was very soluble in acetone and chloroform, soluble in alcohol and benzene, and slightly soluble in ether.

*Anaylsis.*—Calculated for $C_{20}H_{29}O_4N$ (molecular weight=347.44): C, 69.1%; H, 8.4%; N, 4.0%. Found: C, 68.9%; H, 8.2%; N, 4.1%.

This compound is not described in the literature.

*Step B—Isomerization.*—2.7 g. of 17β-acetoxy-3-oximino-A-nor-B-homo-5ξ,10ξ-estrane-6-one were dissolved in 5.5 cc. of formic acid and allowed to stand at room temperature for a period of two hours. Next the reaction mixture was poured into water. The product formed was vacuum filtered, washed with water, then dissolved in methylene chloride. The water was decanted, the methylene chloride phase was evaporated to dryness under vacuum, and a residue was obtained which when crystallized from ether, furnished 2.43 g. of 17β-acetoxy-3-oximino-A-nor-B-homo-5ξ,10ξ-estrane-6-one, melting at 210° C. and having a specific rotation $[\alpha]_D^{20} = -85°$ (c.=0.5% in chloroform). This product was an isomer of the starting oxime compound. This product occurred in the form of hexagonal crystals and was very soluble in alcohol, acetone and chloroform, and less soluble in ether.

*Anaylsis.*—Calculated for $C_{20}H_{29}O_4N$ (molecular weight=347.44): C, 69.1%; H, 8.4%; O, 18.4%; N, 4.0%. Found: C, 69.3%; H, 8.4%; O, 18.3%; N, 4.1%.

The I.R. spectra showed different absorptions in the C=C and C=N regions with reference to the starting compound (represented in its enolic form).

This compound is not described in the literature.

*Step C—Cyclization.*—2.4 g. of 17β-acetoxy-3-oximino-A-nor-B-homo-5ξ,10ξ-estrane-6-one, having a specific rotation $[\alpha]_D^{20} = -85°$, were introduced into a mixture of 20 CC. of pyridine and 5 cc. of phosphorus oxychloride, cooled to 0° C. The reaction mixture was agitated for a period of an hour and a half. Next it was poured on ice, the product formed was vacuum filtered and taken up in 50 CC. of methylene chloride. The methylene chloride solution was washed with dilute hydrochloric acid, then with water, dried, and evaporated to dryness under vacuum. The residue was crystallized from isopropyl ether and furnished 1.34 g. of 17β-acetoxy-isoxazolo-[3,5,6-c,d]-A-nor-B-homo-Δ⁵-10ξ-estrene, having a melting point of 154° C. and a specific rotation $[\alpha]_D^{20} = +16°$ (c.=0.5% in chloroform). The product occurred in the form of hexagonal crystals and was very soluble in alcohol, acetone and chloroform, slightly soluble in ether and insoluble in water.

*Analysis.*—Calculated for $C_{20}H_{27}O_3N$ (molecular weight=329.42): C, 72.9%; H, 8.3%; N, 4.25%. Found: C, 73.0%; H, 8.3%; N, 4.5%.

This compound is not described in the literature.

In a similar manner, by treating the unisomerized product having a specific rotation $[\alpha]_D^{20} = +156°$, with phosphorus oxychloride according to the operatory mode described above, 17β-acetoxy-isoxazolo-[3,5,6-c,d]-A-nor-B-homo-Δ⁵-10ξ-estrene, identical to the product described above, was obtained with slightly lower yields.

EXAMPLE 2

CYCLIZATION BY FORMIC ACID 2 g. of 17β-acetoxy-3-oximino-A-nor-B-homo-5ξ,10ξ-estrane-6-one were dissolved in 6 cc. of formic acid and allowed to stand for 2 hours at 20° C. Then the reaction mixture was heated 10 minutes at reflux. The product was processed according to the usual operatory methods and 17β-acetoxy-isoxazolo-[3,5,6-c,d]-A-nor-B-homo-Δ⁵-10ξ-estrene (I, R=COCH₃) was obtained, identical to the sample obtained according to Example 1.

EXAMPLE 3

PREPARATION OF ISOXAZOLO-[3,5,6-c,d]-A-NOR-B-HOMO-Δ⁵-10ξ-ESTRENE-17β-OL (I, R=H)

330 mgm. of 17β-acetoxy-isoxazolo-[3,5,6-c,d]-A-nor-B-homo-Δ⁵-10ξ-estrene were placed in suspension in 3.3 cc. of methanol. 1.5 cc. of 2 N methanolic potassium hydroxide were added and the reaction mixture was allowed to stand at 28° C. for a period of four hours. Water was next added to the reaction mixture. The product formed was vacuum filtered, washed with water, and dried. 256 mgm. of isoxazolo-[3,5,6-c,d]-A-nor-B-homo-Δ⁵-10ξ-estrene-17β-ol were obtained, having a melting point of 180° C. and a specific rotation $[\alpha]_D^{20} = +19°$ (c=0.5% in chloroform). The product was very soluble in chloroform, soluble in alcohol and acetone, slightly soluble in ether.

*Analysis* — Calculated for $C_{18}H_{25}O_2N$ (molecular weight=287.39): C, 75.2%; H, 8.8%; O, 11.1%. Found: C, 75.5%; H, 8.9%; O, 11.3%.

This compound is not described in the literature.

Isoxazolo - [3,5,6-c,d] - A-nor-B-homo-Δ⁵-10ξ-estrene-17β-ol as well as its esters with hydrocarbon carboxylic acids having from 1 to 8 carbon atoms possess notably a remarkable testosteronic action. The compounds are markedly more androgenic than nor-testosterone acetate as well as being more anabolic. Their therapeutic index is more favorable. They can be used for the treatment of disorders of cellular edification and of proteic anabolism, more particularly for the treatment of retardation of staturo—ponderal growth, of symptomatic thinness due to a disorder of nutrition or an endocrine disturbance, of symptomatic asthenia or essential asthenia, of illnesses of senescence or of male or female climacteric.

Isoxazolo - [3,5,6-c,d] - A-nor-B-homo-$\Delta^5$-10$\xi$-estrene-17$\beta$-ol as well as its esters, particularly the acetate which is described in Example 1, are utilized orally, perlingually, transcutaneously or rectally.

They can be utilized in the form of injectable solutions or suspensions, prepared in ampoules and multiple dose flacons, in the form of implants, of tablets, of glossettes and of suppositories.

The useful dosology is controlled between 5 and 10 mgm. per dose and 5 and 40 mgm. per day in the adult as a function of the method of administration. The pharmaceutical forms such as injectable solutes or suspensions, tables, glossettes, implants or suppositories are prepared according to usual procedures.

EXAMPLE 4

PHARMACOLOGICAL STUDY OF ISOXAZOLO-[3,5,6-c,d]-A-NOR-B-HOMO-$\Delta^5$-10$\xi$-ESTRENE-17$\beta$-OL AND ITS ESTERS (a) Determination of the androgenic and anabolic activity—The tests were made according to the technique of Hershberger, Proc. Soc. Evp. Biol. Mel., 1953, 83, 175, slightly modified. This consisted in a daily administration subcutaneously of the compound being studied to male rats castrated at the age of three and a half weeks. The rats were treated by daily injection starting the day after castration for a period of ten days, then sacrificed the 11th day, 22 to 26 hours after the last injection. The animals were autopsied after sacrifice and the affected organs were separated and weighed. In particular, these were the kidneys, the lifter muscle of the anus (levator ani), for the study of the myotrophic and anabolic action as well as the ventral prostate and the seminal vesicles for the study of a simultaneous androgenic effect.

17$\beta$ acetoxy - isoxazolo-[3,5,6-c,d]-A-nor-B-homo-$\Delta^5$ 10$\xi$-estrene was injected subcutaneously at a dose of 82$\gamma$ per rat and per day and the results obtained are given in Table II in comparison with those obtained with the testosterone acetate and the 19-nor testosterone acetate in equimolecular dosages.

TABLE II
[Treatment]

| | Control | Testosterone Acetate | 19-nor-Testosterone Acetate | 17$\beta$-acetoxy-isoxazolo-[3,5,6-c,d]-A-nor-B-homo-$\Delta^5$-10$\xi$-estrene |
|---|---|---|---|---|
| Daily Dose | | 82.5$\gamma$ | 79$\gamma$ | 82$\gamma$ |
| Duration of Treatment, days | | 10 | 10 | 10 |
| Body weight: | | | | |
| Initial | 46 | 48 | 48 | 46 |
| Final | 87 | 79 | 83 | 77 |
| Seminal Vesicles, mgm | 5.7 | 198 | 65 | 138 |
| Ventral Prostate, mgm | 6.6 | 146 | 98 | 99 |
| Fresh Levator ani, mgm | 14.2 | 39.1 | 49 | 62 |
| $R_f$ | 5.2 | 5.4 | 5.4 | 6.1 |
| $R_s$ | 1.1 | 1.2 | 1.3 | 1.3 |
| $l_f$ | 0.16 | 0.49 | 0.59 | 0.80 |
| $l_s$ | 0.05 | 0.10 | 0.13 | 0.19 |
| $l_{th}$ | | 0.10 | 0.38 | 0.51 |

$R_f$=ratio of fresh kidney weight$\times 10^3$ to body weight.
$R_s$=ratio of dry kidney weight$\times 10^3$ to body weight.
$l_f$=ratio of fresh levator ani weight$\times 10^3$ to body weight.
$l_s$=ratio of dry levator ani weight$\times 10^3$ to body weight.
$l_{th}$=weight of fresh levator ani of treated rats−weight of fresh levator ani of control rats / weight of prostate of treated rats−weight of prostate of control rats As can be concluded, the androgenic activity, as determined by the increase in the weight of the seminal vesicles, was about double that of 19-nor-testosterone acetate at an equal molecular dose and was nearly equal to that of 19-nor-testosterone acetate as determined by the increase in the weight of the ventral prostate. On the other hand, the myotrophic and renotropic anabolic activity of the product was superior to that of both testosterone acetate and 19-nor-testoserone acetate. In addition, the product presented a therapeutic index superior to that of 19-nor-testosterone acetate.

(b) Test of estrogenic activity (test of the increase in weight of the uterus).—This test was made according to the technique of Lanson et al. (Hormone Assay, edited by Emmeus, 1950, p. 408).

17$\beta$ - acetoxy - isoxazolo-[3,5,6-c,d]-A-nor-B-homo-$\Delta^5$-10$\xi$-estrene was administered subcutaneously to immature female rats 22 to 23 days old weighing 34 to 39 grams in varying amounts twice a day for a period of 3 days. After sacrifice of the test animals the fourth day, being 72 to 75 hours after the first administration, the uterus of each of the rats was separated, dried and weighed.

The activity of 17$\beta$-acetoxy-isoxazolo-[3,5,6-c,d]-A-nor-B-homo-$\Delta^5$-10$\xi$-estrene was compared to that of 19-nor-testosterone acetate administered to the animals under the same conditions.

The results of these tests appearing in Table III hereafter show that the product, 17$\beta$-acetoxy-isoxazolo-[3,5,6-c,d]-A-nor-B-homo-$\Delta^5$-10$\xi$-estrene, manifested according to this test an estrogenic activity which was weaker than that of 19-nor-testosterone acetate.

TABLE III

| Treatment | Total Dose Administered per Rat | Weight of Uterus expressed in mg. |
|---|---|---|
| Controls | 0 | 24 |
| 19-nor-testosterone acetate | 57.6$\gamma$ | 55 |
| | 230$\gamma$ | 87 |
| | 2,300$\gamma$ | 105 |
| 17$\beta$-acetoxy-isoxazolo-[3,5,6-c,d]-A-nor-B-homo-$\Delta^5$-10$\xi$-estrene | 60$\gamma$ | 24 |
| | 260$\gamma$ | 41 |
| | 2,400$\gamma$ | 85 |

The preceding examples illustrate the invention without, however, limiting it. It is obvious that other expedients known to those skilled in the art may be employed without departing from the spirit of the invention and the scope of the appended claims.

We claim:

1. A compound of the formula

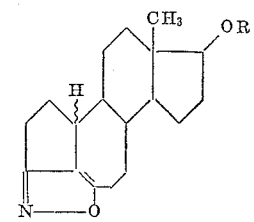

wherein R is selected from the group consisting of hydrogen and the acyl radical of a hydrocarbon carboxylic acid having from 1 to 8 carbon atoms.

2. 17$\beta$ - acetoxy-isoxazolo-[3,5,6-c,d]-A-nor-B-homo-$\Delta^5$-10$\xi$-estrene.

3. Isoxazolo - [3,5,6-c,d]-A-nor-B-homo-$\Delta^5$-10$\xi$-estrene-17$\beta$-ol.

4. The process of producing an isoxazolo derivative of an A-nor-B-homo steroid of the formula

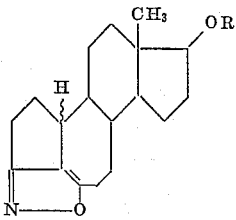

wherein R is selected from the group consisting of hydrogen and the acyl radical of a hydrocarbon carboxylic acid having from 1 to 8 carbon atoms, which comprises the steps of heating a compound of the formula

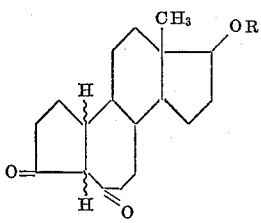

wherein R has the above-noted meaning with about one molecular equivalent of a compound selected from the group consisting of hydroxylamine and its salts in the presence of an inert organic solvent selected from the group consisting of lower alkanols, lower alkanoic acids and mixtures thereof at a temperature between about 50° C. and 150° C., isomerizing the resulting 3-oximino derivative by contacting with a lower alkanoic acid at about room temperature, cyclizing the isomerized 3-oximino derivative by treatment with a dehydrating agent selected from the group consisting of (a) refluxing formic acid and (b) phosphorus oxychloride in pyridine at about −10° C. to +10° C., and recovering said isoxazolo derivative of an A-nor-B-homo steroid.

5. The process of claim 4 wherein said 3-oximino derivative is isomerized by treating with formic acid at room temperatures and said dehydrating agent is phosphorus oxychloride.

6. The process of claim 4 wherein said 3-oximino derivative is isomerized by treating with formic acid at room temperatures and cyclized by heating the isomerized product in the isomerization media to reflux.

References Cited by the Examiner

UNITED STATES PATENTS

| | | | |
|---|---|---|---|
| 2,413,419 | 12/46 | Saunders et al. | 167—74 |
| 2,855,341 | 10/58 | Meier et al. | 167—74 |
| 2,860,158 | 11/58 | Clinton | 260—488 |
| 2,889,355 | 6/59 | Ruzicka et al. | 260—488 |
| 3,047,581 | 7/62 | Gardner et al. | 260—307 |
| 3,073,840 | 1/63 | Kano et al. | 260—307 |
| 3,135,743 | 6/64 | Clinton et al. | 260—307 |

OTHER REFERENCES

Elderfield: Heterocyclic Compounds, vol. 5 (New York, 1957), pages 454–455.

Taylor et al.: Sidgwick's Organic Chemistry of Nitrogen (Oxford, 1942), pages 172–174 and 181–182.

Wiley: Heterocyclic Compounds (New York, 1962), pages 224–8.

NICHOLAS S. RIZZO, *Primary Examiner.*

JOHN D. RANDOLPH, *Examiner.*